(12) United States Patent
Mazzetti (10) Patent No.: US 7,000,409 B2
(45) Date of Patent: *Feb. 21, 2006

(54) USE OF FLOW THROUGH CAPACITOR IN THE RECOVERY AND PURIFICATION OF WATER FROM EXHAUST GASES OF INTERNAL COMBUSTION ENGINES

(76) Inventor: Marit Jagtoyen Mazzetti, 2609 W. 118th St., Leawood, KS (US) 66211

(*) Notice: Subject to any disclaimer, the term of this patent is extended or adjusted under 35 U.S.C. 154(b) by 0 days.

This patent is subject to a terminal disclaimer.

(21) Appl. No.: 10/849,648

(22) Filed: May 20, 2004

(65) Prior Publication Data

US 2004/0231345 A1 Nov. 25, 2004

Related U.S. Application Data

(60) Provisional application No. 60/472,942, filed on May 23, 2003.

(51) Int. Cl.
*F25D 17/06* (2006.01)

(52) U.S. Cl. .............................. 62/93; 60/309; 210/669; 95/39

(58) Field of Classification Search .................. 62/92, 62/93; 60/309, 274, 297; 210/669, 687, 210/688, 694, 900; 95/39, 288
See application file for complete search history.

(56) References Cited

U.S. PATENT DOCUMENTS

| 1,653,603 | A |   | 12/1927 | Schröder |
|---|---|---|---|---|
| 2,071,868 | A |   | 2/1937 | von Lüde |
| 2,310,767 | A |   | 2/1943 | Dürr |
| 2,479,766 | A |   | 8/1949 | Mulvany |
| 3,408,289 | A |   | 10/1968 | Gustafson |
| 3,928,192 | A | * | 12/1975 | Katzakian et al. .......... 210/670 |
| 3,985,648 | A |   | 10/1976 | Casolo |
| 4,151,079 | A | * | 4/1979 | Horembala ................... 521/26 |
| 4,263,263 | A |   | 4/1981 | Vaseen |
| 4,279,756 | A | * | 7/1981 | Weiss et al. ................. 210/667 |
| 4,374,028 | A |   | 2/1983 | Medina |
| 4,430,226 | A |   | 2/1984 | Hegde et al. |
| 4,656,831 | A |   | 4/1987 | Budinikas et al. |
| 4,725,359 | A |   | 2/1988 | Ray |
| 4,747,958 | A | * | 5/1988 | Eberhardt .................... 210/749 |
| 4,813,632 | A |   | 3/1989 | Woodhouse |

(Continued)

FOREIGN PATENT DOCUMENTS

DE      19641013 A1 *   7/1997

(Continued)

OTHER PUBLICATIONS

Jagtoyen, et al., U.S. Army SBIR Contractor's Scientific and Technical Report (Report A002 and A003), "Activated Carbon Fiber Composite for On-baord Water Recovery Unit," (SBIR Topic A97090) May 19, 1998.

*Primary Examiner*—Mohammad M. Ali
(74) *Attorney, Agent, or Firm*—Frost Brown Todd LLC (57) ABSTRACT

A process for recovering potable water from the exhaust gases of an internal combustion engine is disclosed. In this process the exhaust gases are cooled causing water to condense out, and the water formed is passed through particulate filters, activated carbon filters and ion exchange resin filters. In this process, the water is treated to reduce the levels of nitrates, sulfates, acidic and other organic components therein (for example, by passing it through a flow through capacitor) before the water is passed through the ion exchange resins. The apparatus for practicing this process is also disclosed.

12 Claims, 4 Drawing Sheets

U.S. PATENT DOCUMENTS

| | | | |
|---|---|---|---|
| 4,839,052 A * | 6/1989 | Maree | 210/603 |
| 4,863,637 A | 9/1989 | Matsumoto et al. | |
| 5,174,902 A | 12/1992 | Shubert et al. | |
| 5,256,268 A | 10/1993 | Goto et al. | |
| 5,607,595 A | 3/1997 | Hiasa et al. | |
| 5,779,891 A * | 7/1998 | Andelman | 210/198.2 |
| 5,795,843 A | 8/1998 | Endo | |
| 5,857,324 A | 1/1999 | Scappatura et al. | |
| 6,030,698 A | 2/2000 | Burchell et al. | |
| 6,197,196 B1 * | 3/2001 | Rose et al. | 210/603 |
| 6,228,263 B1 * | 5/2001 | Rose et al. | 210/602 |
| 6,254,789 B1 * | 7/2001 | Marion et al. | 210/765 |
| 6,398,965 B1 | 6/2002 | Arba et al. | |
| 6,462,935 B1 * | 10/2002 | Shiue et al. | 361/511 |
| 6,581,375 B1 | 6/2003 | Jagtoyen et al. | |
| 6,709,560 B1 * | 3/2004 | Andelman et al. | 204/630 |
| 6,818,581 B1 * | 11/2004 | Pasquale et al. | 502/7 |

FOREIGN PATENT DOCUMENTS

| | | |
|---|---|---|
| GB | 626 208 | 7/1949 |
| GB | 1 377 501 | 12/1974 |
| WO | WO 99/49958 | 10/1999 |
| WO | WO 00/04977 | 2/2000 |
| WO | WO 02/059043 | 8/2002 |

* cited by examiner

Purified Volume scaled to two 4.5"x20" canisters

USE OF FLOW THROUGH CAPACITOR IN THE RECOVERY AND PURIFICATION OF WATER FROM EXHAUST GASES OF INTERNAL COMBUSTION ENGINES

CROSS REFERENCE TO RELATED APPLICATION

This application is based on and claims priority from U.S. Provisional Application No. 60/472,942, Jagtoyen, filed May 23, 2003, incorporated herein by reference.

This invention was developed, at least in part, under U.S. Army grant contract No. DAAE07-02-C-L055

TECHNICAL FIELD

The present invention relates to an apparatus and method for the recovery and purification of water from the exhaust gases of internal combustion engines, such as those used in land transit vehicles. More particularly, an on-board, portable device produces potable water from vehicle exhaust gases. More particularly, the present application deals with the purification of the water formed using a flow through capacitor to assist in the removal of metals, inorganics and TOC.

BACKGROUND OF THE INVENTION

The present invention allows for the recovery of water from exhaust gases of internal combustion engines, such as those found in military vehicles, cars, jeeps and all-terrain vehicles. The goal is to provide a source of water for drinking and for other uses, for example, for army troops in the field or campers in a wilderness area. The composition of engine exhaust emissions vary as a function of fuel type and content, as well as the fuel:air ratio, the type of engine and mode of its operation, and factors such as ignition timing, cylinder design and fuel additives. Although the relative concentrations of various exhaust components may change depending on the mode of engine operation, generally the nature and content of exhaust remains within a predictable range. It would be useful to be able to capture the water vapor found in engine exhaust and turn it into drinkable water, particularly for military operations or travel in hostile environments (e.g., desert areas).

The concentration of water vapor in exhaust gases of either gasoline or diesel engines or turbines ranges up to about 10% by volume. Upon cooling the exhaust gases below its dew point, i.e., about 100° F., water begins to condense from the exhaust. Some gases present in the exhaust, such as oxygen, nitrogen and hydrogen, do not condense. The other exhaust components, such as hydrocarbons, sulfur dioxide, nitrogen oxides, carbon dioxide and particulates and suspended solid matter, and other dissolved organic and inorganic matter (including metals), contaminate the condensed water by dissolving in or condensing with the water vapor and must be removed to obtain a potable water product. The treatment apparatus for the recovery of potable water from the engine exhaust must condense the water vapor, remove the particulates, and purify the water produced therefrom, and do this in an efficient and effective way.

Vehicle exhaust gases and the condensed water produced therefrom are very corrosive. The untreated water that is recovered from exhaust gases generally has a pH of from about 1 to about 3 and, in a high temperature environment, corrosion easily occurs in pits and crevices of heat exchangers, ducting and ancillary equipment used to condense it, as well as the various materials, such as the ion exchange resins, used to purify the water. High exhaust temperatures and the elevated ambient temperatures that prevail under desert/arid conditions exacerbate the rates of chemical attack on materials. Hence, the selection of appropriate materials for the condensation/purification components can be extremely important.

A method and apparatus for recovering potable water from the exhaust gases of an internal combustion engine is described in our earlier International Patent Application WO 02/059043 A2, published Aug. 1, 2002, and in U.S. Pat. No. 6,581,375, Jagtoyen and Kimber, issued Jun. 24, 2003, both incorporated herein by reference. The method disclosed comprises the steps of:

(a) cooling said exhaust gases so as to cause water to condense from them (for example, utilizing heat exchangers);

(b) passing said water through one or more particulate filters having a maximum pore size of from about 0.1 to about 10 microns;

(c) passing said water through one or more activated carbon beds or monolithic activated carbon (a preferred one sequentially combining a wood-based carbon having a majority of pores in the range of from about 17 to about 40 Å, with a coal-based water-treatment carbon having an average pore size of from about 6 to about 20 Å—the wood-based carbon preferably made by phosphoric acid activation and treated to minimize the amount of phosphorous released into the water); and (d) passing said water through one or more ion exchange resin beds (preferred resins being a mixed bed of highly acidic and strongly basic Type 1 ion exchange resins and/or mixed bed resins exhibiting ultra-low leaching of organics, such as those made for the semiconductor industry, with low organics and particulate contaminants having high cation and anion exchange capacity).

The order in which steps (c) and (d) are carried out can also be reversed.

The present invention provides an improvement on the process and apparatus disclosed in that patent application.

SUMMARY OF THE INVENTION

Specifically, the present invention relates to a method for recovering potable water from the exhaust gases of an internal combustion engine, comprising the steps of:

(a) cooling said exhaust gases so as to cause water to condense from said exhaust gases; followed by (b) passing said water through one or more particulate filters having a maximum pore size of from about 0.1 to about 10 microns;

(c) passing said water through one or more activated carbon filter beds; and (d) passing said water through one or more ion exchange resin filters; which includes the improvement comprising, prior to step (d), treating said water (for example, using a flow through capacitor) so as to reduce the levels of nitrates, sulfates, acidic and other organic components therein (for example, so as to reduce the ionic conductivity of said water to from about 1000 to about 20 micro S/cm).

The present invention also relates to an apparatus for recovering potable water from the exhaust gases of an internal combustion engine comprising a means for connecting said apparatus to the exhaust portal of said engine;

a means for cooling the exhaust gases so as to cause water in said gases to condense; a means for collecting said water and channeling it to a purification system which comprises one or more particulate filters having an average pore size of from about 0.1 to about 10 microns, one or more activated carbon filter beds, and one or more ion exchange resin beds; and means for collecting the water which has passed through said purification system; and which includes the improvement which comprises the inclusion in said purification system of a means (for example, a flow through capacitor) for reducing the level of nitrates, sulfates, acidic and other organic components in said water prior to passing said water through said one or more ion exchange resin beds.

DESCRIPTION OF THE INVENTION

The present invention is an improvement over the process (and apparatus) described in International Patent Application WO 02/059043, published Aug. 1, 2002, and U.S. Pat. No. 6,581,375, Jagtoyen and Kimber, issued Jun. 24, 2003, both incorporated herein by reference. In that process, the exhaust gases from the internal combustion engine are cooled so as to cause the water vapor contained in those gases to condense; the water formed is passed through one or more particulate filters having a maximum pore size of from about 0.1 to about 10 microns; the water is passed through one or more ion exchange resin beds; and the water is passed through one or more activated carbon beds. The water may also, as a final step, be passed through a polishing bed comprising carbon particulate filters. That invention also includes an apparatus for recovery of potable water from exhaust gases of an internal combustion engine comprising a means for connecting said apparatus to the exhaust portal of said engine (preferably via the catalytic converter); a means for cooling the exhaust gases so as to cause the water in those gases to condense; a means for collecting the water and channeling it to a purification system which comprises one or more particulate filters having a maximum pore size of from about 0.1 to about 10 microns, one or more activated carbon beds, and one or more ion exchange resin beds; and means for collecting the water which has passed through said purification system.

In the present improvement, the acidic and ionic components, such as sulfates and nitrates, as well as metals and organics, are removed from the condensed water prior to the time that the water is introduced into the ion exchange resins. It was found that the presence of sulfates and nitrates in the untreated condensate was causing problems over time. Specifically, the corrosive nature of the untreated exhaust condensate caused oxidation and degradation of the ion exchange resins and other components of the purification system, with a resulting leaching of organic compounds from the ion exchange resin into the treated water. In the process of the present invention, ionic components, such as sulfates and nitrates, are removed from the condensed water. The process may also remove acidic and polar organic compounds. The net result of this removal is that the ionic conductivity of the condensed water is reduced from about 700–1000 micro S/cm to about 10–50 micro S/cm. It is preferred that the treated condensed water have an ionic conductivity of from about 10 to about 80, more preferably from about 10 to about 50, most preferably from about 10 to about 30, micro S/cm.

One way of accomplishing the removal of these ionic compounds is through the use of a flow through capacitor (FTC). Flow through capacitors are known in the art and are commercially available from Biosource Inc. They are described, for example, in the following U.S. patents, which are all incorporated herein by reference: U.S. Pat. No. 5,192,432, Andelman, issued Mar. 9, 1993; U.S. Pat. No. 5,196,115, Andelman, issued Mar. 23, 1993; U.S. Pat. No. 5,200,068, Andelman, issued Apr. 6, 1993; and U.S. Pat. No. 5,360,540, Andelman, issued Nov. 1, 1994. Generally, the flow rate through the capacitor will be from about 0.1 to about 2 lpm (preferably about 500 ml/min), the current in the capacitor is from about 7 to about 11 A, and the voltage is between about 1.2 and about 1.5 V.

Another technology that may be useful in treatment of the condensate is electrochemical treatment where a voltage of 12–18 V at 2–4 A is applied to electrodes immersed in the water (i.e., an electrochemical cell). Powerful oxidizing agents are produced without the addition of chemicals. Most kinds of organic contaminants present in aqueous effluents are destroyed or oxidatively degraded. BOD, COD, TOC, odor, color, microorganisms, or other parameters indicative of the presence of organic contaminants can be reduced to the ppb level or lower.

Reverse osmosis, a process well known in the art, may also be used to treat the condensate.

The removal of acidic and ionic components from the condensate will render the water less corrosive before it enters the ion exchange resin bed. By removing the sulfates, nitrates and organic acids prior to running it through the ion exchange resin bed, corrosion to the bed will be minimized. An additional benefit of this process is the potential to remove ionic contaminants from surface waters and sea water, allowing the use of these as alternative water sources for the purification system disclosed herein.

EXAMPLE

The following example illustrates the process and apparatus of the present invention.

The internal combustion engine exhaust utilized in this example was produced while driving a 1994 civilian-equipped Hummer, modified to practice the present invention, which included a heat exchanger to condense the water from the exhaust gases (manufactured by NSM Corporation, England). The water purification train of the present invention consisted of particulate filters, a flow through capacitor, two different granular carbon filters and one ion exchange resin filter.

The condensate was first filtered through laminated glass fiber paper (maximum pore size 2 microns), which acted as a particulate filter, removing an average of 55 ppm of solids. The glass fiber paper was manufactured by Hollingsworth and Vose.

The condensate was carbon-treated prior to introduction into the flow through capacitor (FTC) to remove neutral organics that can foul the membranes and electrodes of the FTC. The carbon filter materials utilized were selected based on two main criteria: high hardness and wide pore size distribution. In this example, two different carbons were used. The first was coal-based carbon F300 from Calgon, which has high hardness and high density and, as a result, exhibits high capacity for organic removal from water. The second carbon utilized has a relatively wide pore size distribution and is a wood-based carbon, such as RGC from Westvaco. This carbon is used to remove large molecular weight organics as well as some polar organics that coal-based carbons with less functionality do not remove as well. The carbon materials were packed sequentially in a 2-inch diameter, 10-inch tall SS bed operating in an up-flow mode. The flow rate through the bed was 22 ml/min, which is equivalent to about 150–200 ml/min in a full size bed (which would be able to treat more than 2 gallons of water/hour). The results of the carbon treatment are shown in Tables 1 and 2 and FIG. 1. The TOC of the condensate water is lowered by this procedure from a starting TOC of about 50–80 ppm to below about 20–30 ppm, i.e., most of the nonpolar organics and some polar organics are removed.

TABLE 1

TOC at different stages of treatment for condensates W177/78

| W177/78 | A | B | C |
| --- | --- | --- | --- |
| Untreated | 67.52 | 67.52 | 67.52 |
| Carbon | 9.53 | 11.48 | 12.34 |
| Capacitor pure | 7.75 | 10.41 | 11.81 |
| Capacitor waste | 8.03 | 11.9 | 12.46 |
| R1 | — | 3.85 | |
| R2 | 2.61 | 1.07 | |
| Carbon | 0.82 | 0.23 | |

R1: WA-30 Mitsubishi
R2: SMT200L, Mitsubishi

TABLE 2

TOC at different stages of treatment for condensate W185

| W185 | A | B | C | D | E | F | Waste AC |
| --- | --- | --- | --- | --- | --- | --- | --- |
| Untreated | 54.44 | 54.44 | 54.44 | 54.44 | 54.44 | 54.44 | |
| Carbon | 9.38 | 10.64 | 14.12 | 14.49 | 20.03 | 21.89 | |
| Capacitor pure | 9.01 | | 9.58 | 10.4 | | 13.42 | 8.98 |
| Capacitor waste | 9.58 | | 10.92 | 14.22 | | 24.97 | 12.42 |
| R1 | 6.56 | 9.12 | 9.41 | 9.04 | | 10.51 | 9.12 |
| R2 | | 3.44 | | 6.836 | | | 6.96 |
| Carbon | | 1.61 | | 3.844 | | | 5.93 |

R1: WA-30, Mitsubishi
R2: SMT200L, Mitsubishi

A flow through capacitor (FTC), produced by Biosource, Inc., was used in this example. The flow through capacitor consists of two electrodes: one positive and one negative. Charged compounds are absorbed on the electrodes, and when the capacitor has reached saturation it is discharged. The absorbed ions are desorbed and form a waste stream that is discarded. For this application, the capacitor should be optimized to have a waste stream that comprises less than about 5% of the water treated. The FTC can remove impurities like metals and sulfates and nitrates from water by flowing it over a charged electrode. The capacitor will remove and hold contaminants from influent condensate when it is appropriately charged. The effluent condensate is thereby purified. At some point during the process, depending upon the flow rate and quality of the incoming stream, the FTC will saturate with impurities and become ineffective. The impurities must then be discharged in a separate effluent waste stream by turning off the surface charge. The polarity of each electrode can be reversed every cycle to prevent fouling of the electrode. A preferred FTC unit is one which is self-regulating for time on line and time for regeneration of the electrodes in order to obtain water of a predefined purity.

Figure 1:
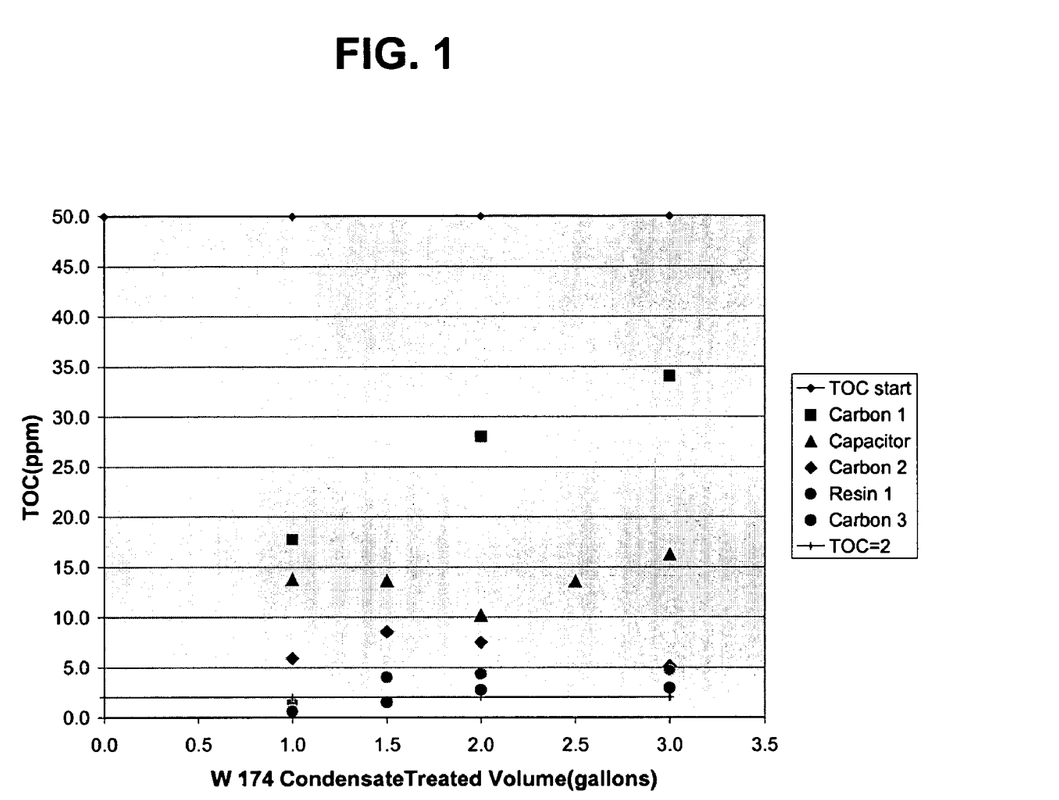
FIG. 1 shows the results of the water treatment process described in the Example.

In this example, Sample W174, exhaust condensate from a titanium cross-flow heat exchanger, was treated with the Biosource FTC. Because of potential problems with TOC accumulating on the capacitor electrode, this condensate was treated with carbon (as described above), before it was run through the capacitor. The total condensate volume treated for W174 was about 3 gallons. The TOC concentration in the purified water after different treatment stages is shown in FIG. 1. The TOC of the condensate before carbon treatment was 49 ppm. The carbon treatment reduces the TOC to 18–34 ppm, by removing all nonpolar and some of the polar organics.

The next stage is treatment with the Biosource FTC to remove nitrates, sulfates, metals, inorganics and polar organics. This was achieved by rejecting a waste stream rich in the polar contaminants. The water was flowed through the capacitor at a flow rate of about 350 ml/min, the voltage was about 40 V, and the current varied between about 1 and about 40 amps. The yield of purified water was 92% in this experiment, i.e., about 8% of the water enriched in contaminants was rejected.

The water was resin treated and carbon treated again at the end to remove any organics leaching from the ion exchange resin bed. A 1-micron filter was used at the end to filter out any fines created during the filtration process. The TOC of the final sample ranged from 0.6–2.9 ppm after 3 gallons of condensate was purified with polishing beds of carbon and resin (see FIG. 1). By using the capacitor, the water yield was reduced by 8%, but the size of the water purification canisters in the apparatus will also be reduced significantly, and the problem of dissolution of the binder in the ion exchange resin is avoided as a result of removing the sulfates and nitrates at an early stage in the process.

A second capacitor with Teflon® membranes (Biosource, Inc.) was tested to determine if it was more resistant to the acidic environment of the exhaust condensate (flow rate≈300 ml/min; capacitor charge=7–10 A and 1.2 V). Water condensate samples W177 and W185 were both treated in this capacitor. The TOC of the starting condensate and the purified water are shown in Tables 1 and 2. A total of 2.5 gallons of W177 were treated. For sample W185, 3 gallons were treated. The TOC content of the water was not reduced significantly, only 1–2 ppm, using this cell (see Tables 1 and 2), suggesting that the earlier data where TOC was lowered could be partially due to retention on the cell, or that the operation of the cell was such that it was not in balance, i.e., too little time was allowed for regeneration so that TOC was accumulating at the electrodes.

The capacitor removed the nitrates, sulfates and metals to below detectable limits (BDL), as can be seen in Table 3. The nitrate and sulfate content of the raw condensate was 0.6 and 72 ppm, respectively, and after treatment with the capacitor the nitrates were below 0.02 ppm and sulfates were below 0.2 ppm. All metals were removed to BDL, except for trace levels of sodium, silica, iron and calcium, none of which are hazardous and all of which would be removed by the ion exchange resin downstream. Since the capacitor is so efficient in removing the inorganics and metals, the size of the ion exchange resin bed can be significantly reduced.

TABLE 3

Metal Content of Condensates treated by Carbon and Flow Through Capacitor (FTC)

| Parameter | MRL | MCL | Raw Condensate W177/78 | Carbon & Capacitor W177C2P1 | W177C3P1 | W177C4P1 | Units | Method |
|---|---|---|---|---|---|---|---|---|
| Metals | | | | | | | | |
| Antimony | 1 | 6 | <1.0 | <1.0 | <1.0 | <1.0 | µg/L | 200.8 |
| Arsenic | 2 | 10 | <2.0 | <2.0 | <2.0 | <2.0 | µg/L | 200.8 |
| Barium | 2 | 2000 | 38 | <200 | <200 | <200 | µg/L | 200.8 |
| Beryllium | 0.3 | 4 | <0.3 | <10 | <10 | <10 | µg/L | 200.8 |
| Cadmium | 1 | 5 | <1.0 | <10 | <10 | <10 | µg/L | 200.8 |
| Lead | 1 | 15 | 2 | <1.0 | <1.0 | <1.0 | µg/L | 200.8 |
| Nickel | 1 | 100 | 240 | <40 | <40 | <40 | µg/L | 200.8 |
| Selenium | 2 | 50 | <2.0 | <2.0 | <2.0 | <2.0 | µg/L | 200.8 |
| Thallium | 0.4 | 2 | <0.4 | <100 | <100 | <100 | µg/L | 200.8 |
| Aluminum | 2 | 50–200 | 8500 | <200 | <200 | <200 | µg/L | 200.8 |
| Boron | 5– | | 850 | <10 | <10 | 80 | µg/L | 200.8 |
| Calcium | 0.1– | | | 0.05 | 0.05 | 0.05 | mg/L | 3111B |
| Cobalt | 2– | | <2.0 | <50 | <50 | <50 | µg/L | 200.8 |
| Copper | 1 | 1000 | 37 | <20 | <20 | <20 | µg/L | 200.8 |
| Iron | 0.1 | 0.3 | | 0.014 | 0.008 | 0.006 | mg/L | 3111B |
| Magnesium | 0.05– | | 0.2 | <10 | <10 | <10 | mg/L | 3111B |
| Manganese | 2 | 50 | 33 | <5 | <5 | <5 | µg/L | 200.8 |
| Molybdenum | 2– | | 13 | <200 | <200 | <200 | µg/L | 200.8 |
| Potassium | 0.05– | | | <40 | <40 | <40 | mg/L | 3111B |
| Silica | 0.2– | | | 0.74 | 1.1 | 0.7 | mg/L | 200.7 |
| Silver | 2 | 100 | <2.5 | <20 | <20 | <20 | µg/L | 200.8 |
| Sodium | | | | 0.29 | 0.28 | 1.09 | mg/L | |
| Titanium | 5– | | <5.0 | <5.0 | <5.0 | <5.0 | µg/L | 200.8 |
| Vanadium | 2– | | <2.0 | <200 | <200 | <200 | µg/L | 200.8 |
| Zinc | 5 | 5000 | 350 | <10 | <10 | <10 | µg/L | 200.8 |
| Inorganics | | | | | | | | |
| Nitrate | 0.1 | | 0.6 | <0.02 | <0.02 | <0.02 | mg/L | 300 |
| Sulfate | 0.1 | | 72 | <0.2 | <0.2 | <0.2 | mg/L | 300 |
| TOC | 0.5 | 2 | 67.52 | 7.73 | 10.2 | 11.81 | ppm | Lexcarb |
| Conductivity | | | | 20 | 25 | 50 | microS/cm | |
| Solids | 0.5 | | | | | | ppm | Lexcarb |
| pH | | | 3.1 | 5.4 | | | | |

Jet fuel, such as JP8, may be used as a fuel in the HMMWV engine. The resulting condensate is more acidic that condensates made from commercial diesel fuel with pH ranging from 1.7–2.3 for JP8, and 2–2.3 for diesel. This is due to the higher sulfur content in JP8. The sulfur content of JP8 fuel can be as high as 3000 ppm, while in diesel it is about 500 ppm. In the examples given below, the sulfur content was 1620 ppm resulting in a condensate pH of 1.7–2.3. The high acidity does affect ion exchange resin performance. The resin performance is degraded due to the acidic condensate resulting in higher TOCs than previously seen in the purified water.

Based on previous data, a flow through capacitor was designed for exhaust condensate purification. This capacitor was optimized to only deliver high quality water of a certain conductivity (in the range 20–80 micro S/cm) while maintaining a high yield of purified water. The results from water purification studies with JP8 fuel have been excellent when using the capacitor as part of the water purification.

Figure 2:
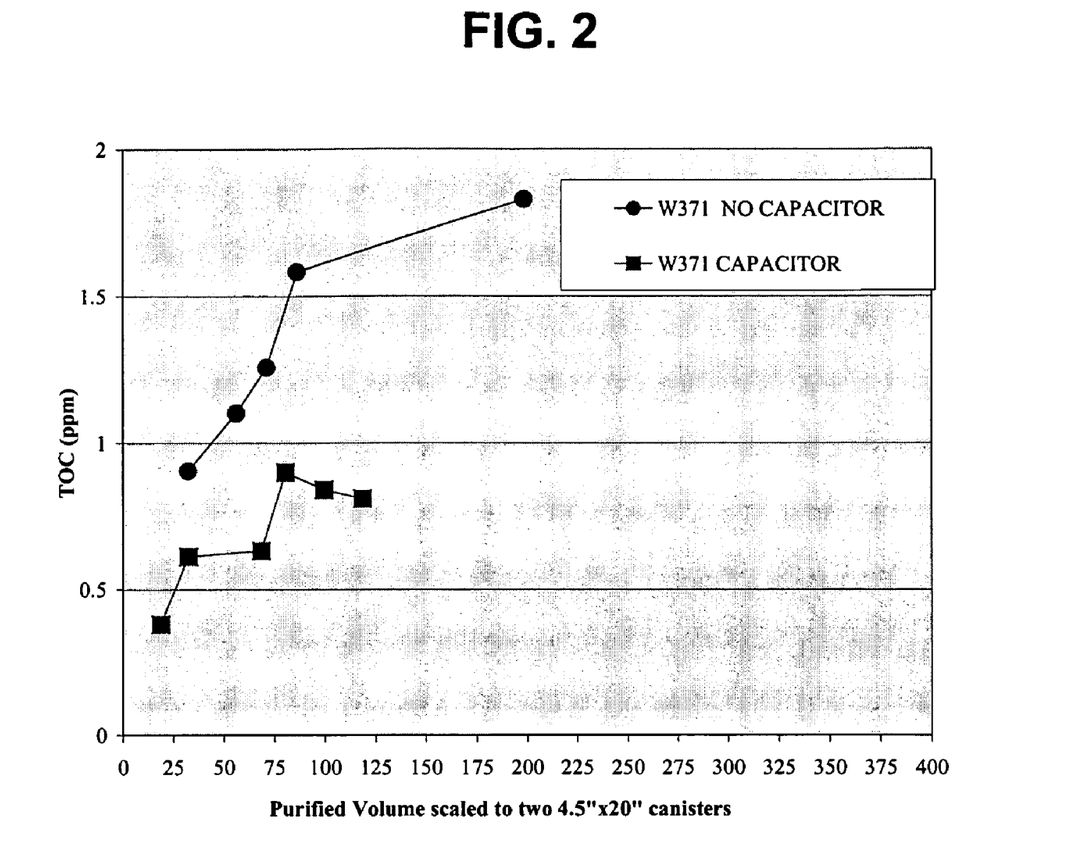
FIGS. 2 and 3 show TOC levels from the process described in the Example (samples W371 and W374).
Figure 3:
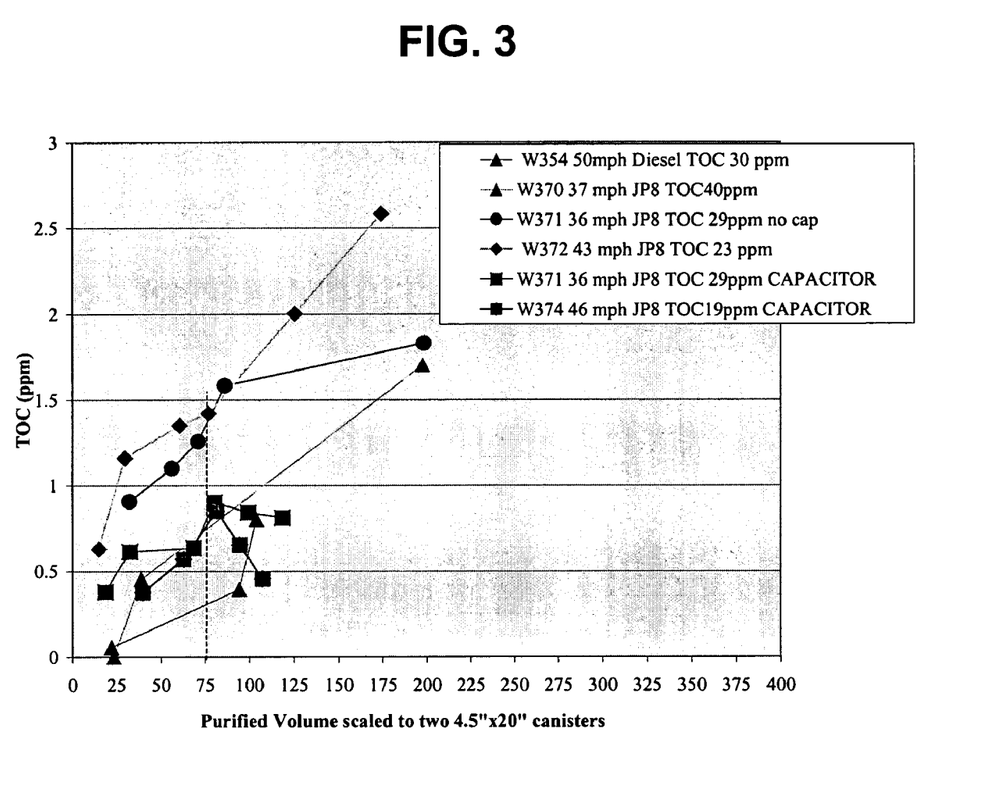
Figure 4:
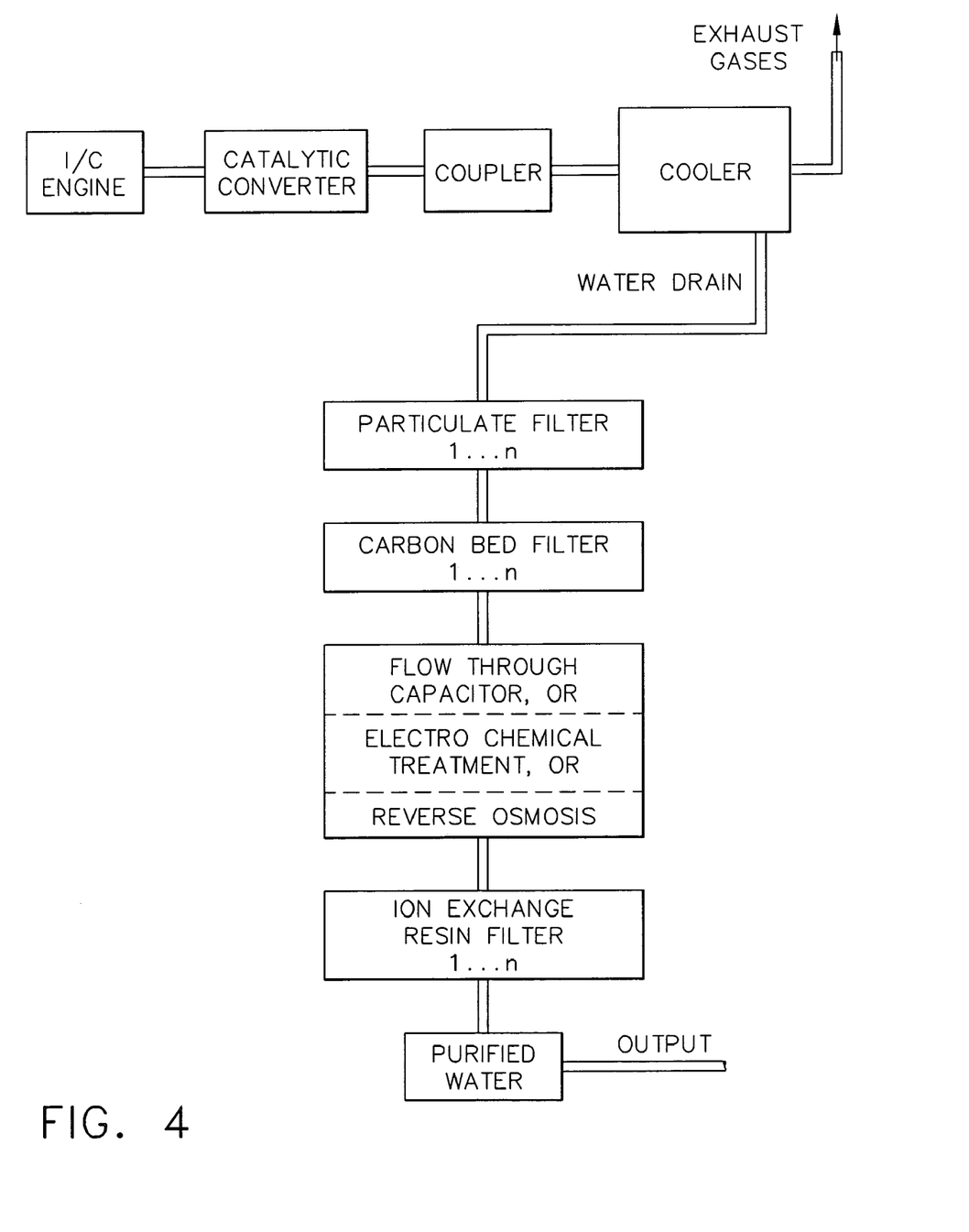
FIG. 4 is a block flow chart diagram illustrating the method and apparatus of the present invention, including the use of a flow through capacitor, electrochemical treatment or reverse osmosis process to control the levels of nitrates, sulfates, acidic and other organic components in the water produced.

Two different exhaust condensates (W371 and W374) were purified with the resin/carbon filtration system, described above and in U.S. Pat. No. 6,481,375. In separate runs, the same condensates were pretreated with the capacitor prior to the resin/carbon treatment. The data from the capacitor runs are shown in FIGS. 2 and 3, and the results of the water purification study in Table 4.

TABLE 4

| | TOC (ppm) | | |
|---|---|---|---|
| Purification Stage | W371 | W374 | W371 |
| Condensate | 28.7 | 18.9 | 28.7 |
| Carbon treated | 12.22 | 9.61 | — |
| Capacitor treated | 4.3 | 2.33 | — |
| Resin/Carbon purified water 75 gallon treated | 0.65 | 0.75 | 1.3 |

Description of Capacitor Operation

The basic operation of the capacitor in the present invention is as follows. The capacitor cycling starts with a change in polarity where water is pumped into the spacer. Then the concentration cycle starts and lasts for 150 seconds where polar compounds are migrating toward the electrode. The current starts out at about 30 A and drops to about 5 A during the concentration cycle. The voltage stays constant at 1.2 V.

The pump comes on and diverts high conductivity waste to the waste tube and then the polarity is reversed and the pure water starts flowing as soon as it meets the required conductivity level.

Purification cycle: current=6–10 A; voltage=1.2 V

Concentration cycle: current=30 A drops to 5 A; voltage=1.2 V

Waste cycle: current=6–10 A; voltage=1.2 V

In structuring the capacitor cell for use in the present invention, the waste water can be recycled for purification in order to obtain total water yields of 90–95%. A conductivity probe can be used to monitor conductivity in the incoming stream, the purified stream and the waste stream, and the waste can be rejected only when it exceeds a defined limit set to achieve purification yields of 95% or greater. In this way, only water that meets a certain conductivity standard would be allowed to pass through to the next purification step. After treatment of a particular sample by the capacitor, that sample had a conductivity of 30–50 microS/cm. The pH of the sample was still around 5–6, suggesting that there were still acidic organics in the water since all the nitrates and sulfates had been removed. In that case, the condensate was treated with a base ion exchange resin, for example UP 4000 from Rohm and Haas, before treatment with the high purity, low TOC leaching resin, in this case UP 6040, from Rohm and Haas (SMT 2001 from Mitsubishi gives similar results). The condensate may then be carbon treated. The final TOC content of the samples varied from 0.2 ppm to as high as 5 ppm.

What is claimed is:

1. In a method for recovering potable water from the exhaust gases from an internal combustion engine, comprising the steps of:
   (a) cooling said exhaust gases so as to cause water to condense from said exhaust gases; followed by
   (b) passing said water through one or more particulate filters having a maximum pore size of from about 0.1 to about 10 microns;
   (c) passing said water through one or more activated carbon filter beds; and
   (d) passing said water through one or more ion exchange resin filter beds;
the improvement which comprises, prior to step (d), treating said water so as to reduce the levels of nitrates, sulfates, acidic and other organic components therein.

2. The method according to claim 1 wherein said treatment is carried out by passing said water through a flow through capacitor.

3. The method according to claim 1 wherein said treatment is carried out by passing said water through an electrochemical cell or treating it by reverse osmosis.

4. The method according to claim 2 wherein said nitrates, sulfates, acidic and other organic components are reduced to below detectable limits by said treatment.

5. The method according to claim 2 wherein the water has an ionic conductivity of from about 10 to about 80 micro S/cm, after treatment with the capacitor.

6. The method according to claim 5 wherein the water has an ionic conductivity of from about 10 to about 50 micro S/cm, after treatment with the capacitor.

7. The method according to claim 6 wherein the water has an ionic conductivity of from about 10 to about 30 micro S/cm, after treatment with the capacitor.

8. A method for recovering potable water from the exhaust gases from an internal combustion engine, comprising the steps of:
   (a) cooling said exhaust gases so as to cause water to condense from said exhaust gases; followed by the following steps carried out in any order:
   (b) passing said water through one or more particulate filters having a maximum pore size of from about 0.1 to about 10 microns;
   (c) passing said water through a treatment to oxidize/remove organics, selected from a flow through capacitor, an electrochemical cell, reverse osmosis, and combinations thereof;
   (d) passing said water through one or more activated carbon filter beds; and
   (e) passing said water through one or more ion exchange resin filter beds;
provided step (c) is carried out prior to step (e).

9. The method according to claim 8 wherein after step (c) the water has an ionic conductivity of from about 10 to about 80 micro S/cm.

10. In an apparatus for recovering the exhaust gases of an internal combustion engine comprising a means for connecting said apparatus to the exhaust portal of said engine; a means for cooling the exhaust gases so as to cause the water in said gases to condense; a means for collecting said water and channeling it to a purification system which comprises one or more particulate filters having an average pore size of from about 0.1 to about 10 microns, one or more activated carbon filter beds, and one or more ion exchange resin beds; and means for collecting the water which has passed through said purification system; the improvement which comprises the inclusion in said purification system of a means for reducing the level of nitrates, sulfates, acidic and other organic components in said water prior to passing said water through said one or more ion exchange resin beds.

11. The apparatus according to claim 10 wherein said means for reducing nitrates, sulfates, acidic and other organic components comprises a flow through capacitor.

12. The apparatus according to claim 11 wherein said means for reducing nitrates, sulfates, acidic and other organic components reduces the ionic conductivity of the water to from about 10 to about 80 micro S/cm.

* * * * *